US 9,689,397 B2

(12) United States Patent
Edwards et al.

(10) Patent No.: US 9,689,397 B2
(45) Date of Patent: Jun. 27, 2017

(54) TURBINE OUTLET DIFFUSER

(71) Applicant: GM GLOBAL TECHNOLOGY OPERATIONS LLC, Detroit, MI (US)

(72) Inventors: Brian J. Edwards, Macomb, MI (US); Louis P. Begin, Rochester, MI (US); Carnell E. Williams, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 14/713,498

(22) Filed: May 15, 2015

(65) Prior Publication Data
US 2015/0361985 A1 Dec. 17, 2015

Related U.S. Application Data

(60) Provisional application No. 62/012,011, filed on Jun. 13, 2014.

(51) Int. Cl.
| | | |
|---|---|---|
| *F02B 37/00* | (2006.01) | |
| *F02B 37/18* | (2006.01) | |
| *F04D 17/10* | (2006.01) | |
| *F01D 9/02* | (2006.01) | |
| (Continued) | | |

(52) U.S. Cl.
CPC ............ *F04D 17/10* (2013.01); *F01D 9/026* (2013.01); *F01D 17/105* (2013.01); *F01D 25/30* (2013.01); *F02B 37/00* (2013.01); *F02B 37/183* (2013.01); *F02B 37/186* (2013.01); *F05D 2220/40* (2013.01); *F05D 2230/54* (2013.01);
(Continued)

(58) Field of Classification Search
CPC ...... F02B 37/00; F02B 37/183; F02B 37/186; F04D 17/10; F01D 9/026; F01D 17/105; F01D 25/30; F05D 2220/40; F05D 2230/54; F05D 2250/324; F05D 2250/52
See application file for complete search history.

(56) References Cited

U.S. PATENT DOCUMENTS

| | | | | |
|---|---|---|---|---|
| 5,579,643 | A | * 12/1996 | McEwen | ............... F02B 37/025 415/151 |
| 5,857,337 | A | * 1/1999 | Kawasaki | ............. F02B 37/183 60/602 |
| 2011/0126537 | A1 | 6/2011 | Yoshimoto et al. | |

(Continued)

FOREIGN PATENT DOCUMENTS

| | | |
|---|---|---|
| CN | 101201012 A | 6/2008 |
| CN | 102282345 A | 12/2011 |

(Continued)

*Primary Examiner* — Audrey K Bradley
(74) *Attorney, Agent, or Firm* — Quinn IP Law

(57) ABSTRACT

A turbocharger for an internal combustion engine includes a rotating assembly having a turbine wheel disposed inside a turbine housing and a compressor wheel disposed inside a compressor cover. The turbine housing defines a turbine outlet cavity, a turbine housing inlet, and a turbine housing outlet. The turbine housing inlet is configured to channel engine post-combustion gases to the turbine wheel and the turbine housing outlet is configured to exhaust the gases aft of the turbine wheel. A diffuser arranged inside the turbine outlet cavity is configured to channel the post-combustion gases aft of the turbine wheel and out to the turbine housing outlet, without discharging into the turbine outlet cavity.

14 Claims, 3 Drawing Sheets

(51) Int. Cl.
*F01D 17/10* (2006.01)
*F01D 25/30* (2006.01)

(52) U.S. Cl.
CPC .... *F05D 2250/324* (2013.01); *F05D 2250/52* (2013.01); *Y02T 10/144* (2013.01)

(56) References Cited

U.S. PATENT DOCUMENTS

| | | | | |
|---|---|---|---|---|
| 2013/0000300 A1* | 1/2013 | O'Hara | ................ | F01D 9/026 60/605.2 |
| 2013/0036733 A1* | 2/2013 | Severin | ................ | F01D 17/165 60/605.1 |
| 2013/0091832 A1* | 4/2013 | Friedrich | ................ | F16B 2/08 60/323 |

FOREIGN PATENT DOCUMENTS

| | | | |
|---|---|---|---|
| CN | 103362641 A | 10/2013 |
| DE | 102011075449 A1 | 11/2012 |
| EP | 1329616 A2 | 7/2003 |

\* cited by examiner

TURBINE OUTLET DIFFUSER

CROSS-REFERENCE TO RELATED APPLICATION(S)

This application claims the benefit of U.S. Provisional Application Ser. No. 62/012,011 filed Jun. 13, 2014, the entire contents of which is hereby incorporated by reference.

TECHNICAL FIELD

The present disclosure relates to a diffuser for a turbine outlet in a turbocharger assembly.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Frequently, such turbochargers are driven by the engine's exhaust gases.

A typical exhaust gas driven turbocharger includes a central shaft that is supported by one or more bearings and that transmits rotational motion between a turbine wheel and an air compressor wheel. Both the turbine and compressor wheels are fixed to the shaft, which in combination with various bearing components constitute the turbocharger's rotating assembly. Turbochargers frequently employ waste-gate valves to limit operational speeds of the rotating assembly in order to maintain turbocharger boost within prescribed limits and prevent rotating assembly over speed. Such a waste-gate valve is typically positioned in the turbocharger assembly aft of the turbine wheel, thus permitting exhaust gases from both, the turbine wheel and waste-gate valve to exit the turbocharger assembly via a single outlet.

SUMMARY

One embodiment of the disclosure is directed to a turbocharger assembly for pressurizing an airflow for delivery to an internal combustion engine having a cylinder that is configured to receive an air-fuel mixture for combustion therein. The engine also includes a reciprocating piston disposed inside the cylinder and configured to exhaust post-combustion gases therefrom. The turbocharger assembly includes a turbine housing and a compressor cover, a rotating assembly having a turbine wheel disposed inside the turbine housing, and a compressor wheel disposed inside the compressor cover. The rotating assembly is configured to be rotated about an axis by the post-combustion gases.

The turbine housing defines a turbine outlet cavity, a turbine housing inlet, and a turbine housing outlet. The turbine housing inlet is configured to channel the post-combustion gases to the turbine wheel and the turbine housing outlet is configured to exhaust the post-combustion gases aft of the turbine wheel. The turbocharger assembly also includes a diffuser arranged inside the turbine outlet cavity. The diffuser is configured to channel the post-combustion gases aft of the turbine wheel and out to the turbine housing outlet, without discharging into the turbine outlet cavity.

The diffuser may have a cylindrical shape that is arranged on the axis. The diffuser may also have a diverging inner surface configured to channel and diffuse the post-combustion gases aft of the turbine wheel.

The turbocharger assembly may also include a waste-gate valve arranged in the turbine housing and configured to selectively redirect at least a portion of the post-combustion gases into the turbine outlet cavity in bypass of the turbine wheel. In such a case, the diffuser may be additionally configured to separately channel the post-combustion gases aft of the turbine wheel and the portion of post-combustion gases redirected by the waste-gate valve. Accordingly, the diffuser may serve to limit disruption of flow of the post-combustion gases aft of the turbine wheel by the portion of post-combustion gases redirected by the waste-gate valve.

The diffuser may additionally include an outer surface configured to receive and channel the portion of post-combustion gases redirected by the waste-gate valve to the turbine housing outlet.

The turbine housing and the diffuser may be separate components, and, in such a case, the diffuser may be fixed to the turbine housing.

The diffuser may be constructed as a steel pipe.

The diffuser may be fastened to the turbine housing via a snap ring.

The diffuser may include a first end having a flange. In such a case, the snap ring abuts the flange to thereby fix the diffuser to the turbine housing.

The diffuser may include a first portion having a uniform diameter extending from the first end and a flared second portion extending from the first portion to a second end of the diffuser.

Another embodiment of the present disclosure is directed to an internal combustion engine having the turbocharger assembly as described above. The engine may include a catalytic converter close-coupled to the turbine housing outlet. The diffuser may extend beyond the turbine housing outlet to maintain streamlined and focused flow of the post-combustion gases beyond the turbine housing outlet and out to the catalytic converter.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
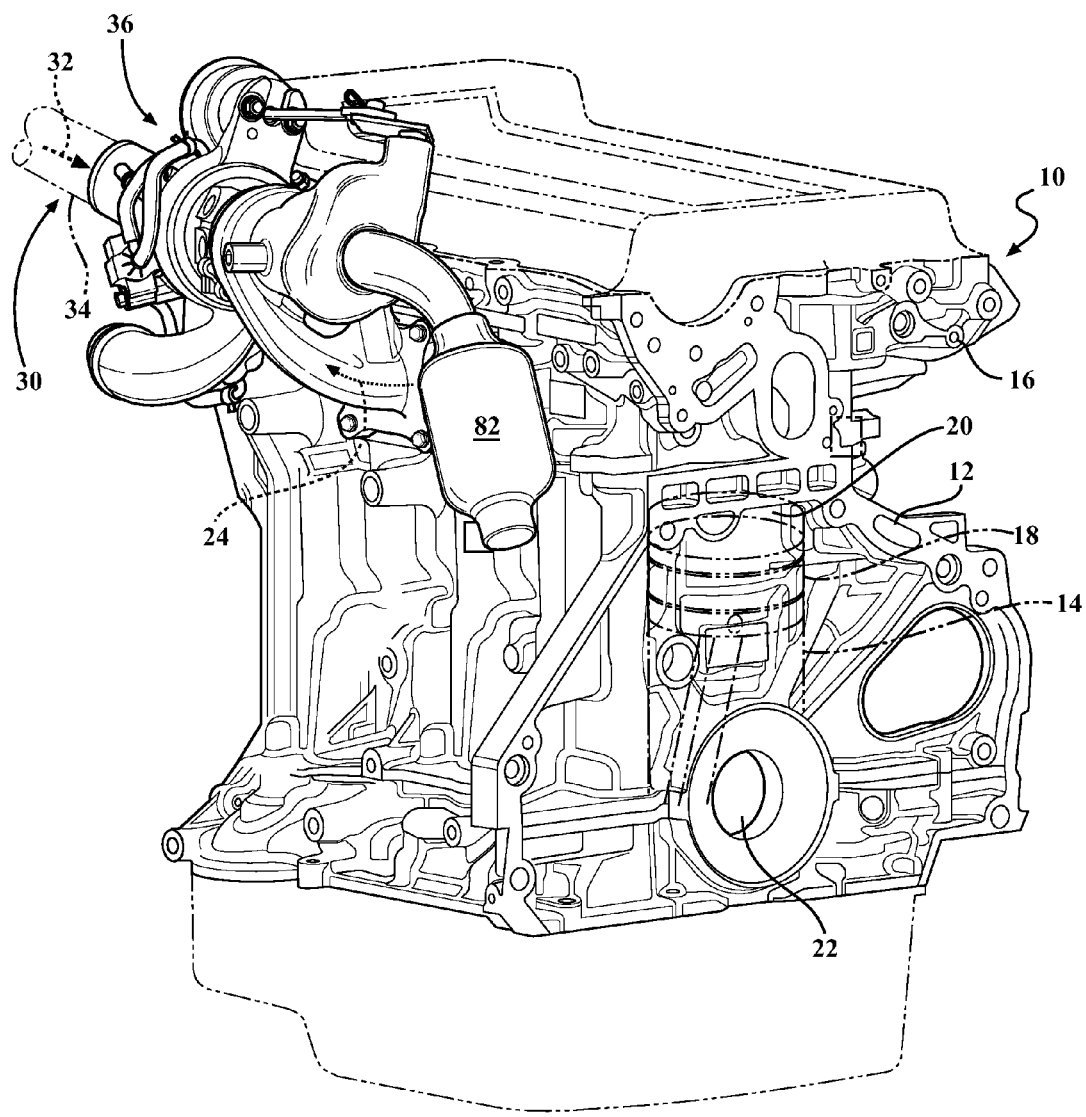
FIG. 1 is a perspective view of an engine with a turbocharger assembly according to an embodiment of the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown in FIG. 1, the engine 10 may also include a cylinder head 16 that is mounted on the cylinder block 12. Each cylinder 14 includes a piston 18 configured to reciprocate therein.

Combustion chambers 20 are formed within the cylinders 14 between the bottom surface of the cylinder head 16 and the tops of the pistons 18. As known by those skilled in the art, each of the combustion chambers 20 receives fuel and air from the cylinder head 16 that form a fuel-air mixture for subsequent combustion inside the subject combustion chamber. The cylinder head 16 is also configured to exhaust post-combustion gases 24 from the combustion chambers 20. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14.

The engine 10 additionally includes an induction system 30 configured to channel an airflow 32 from the ambient to the cylinders 14. The induction system 30 includes an intake air duct 34, a turbocharger assembly 36, and an intake manifold (not shown). Although not shown, the induction system 30 may additionally include an air filter upstream of the turbocharger assembly 36 for removing foreign particles and other airborne debris from the airflow 32. The intake air duct 34 is configured to channel the airflow 32 from the ambient to the turbocharger assembly 36, while the turbocharger assembly is configured to pressurize the received airflow, and discharge the pressurized airflow to the intake manifold. The intake manifold in turn distributes the previously pressurized airflow 32 to the cylinders 14 for mixing with an appropriate amount of fuel and subsequent combustion of the resultant fuel-air mixture.

Figure 2:
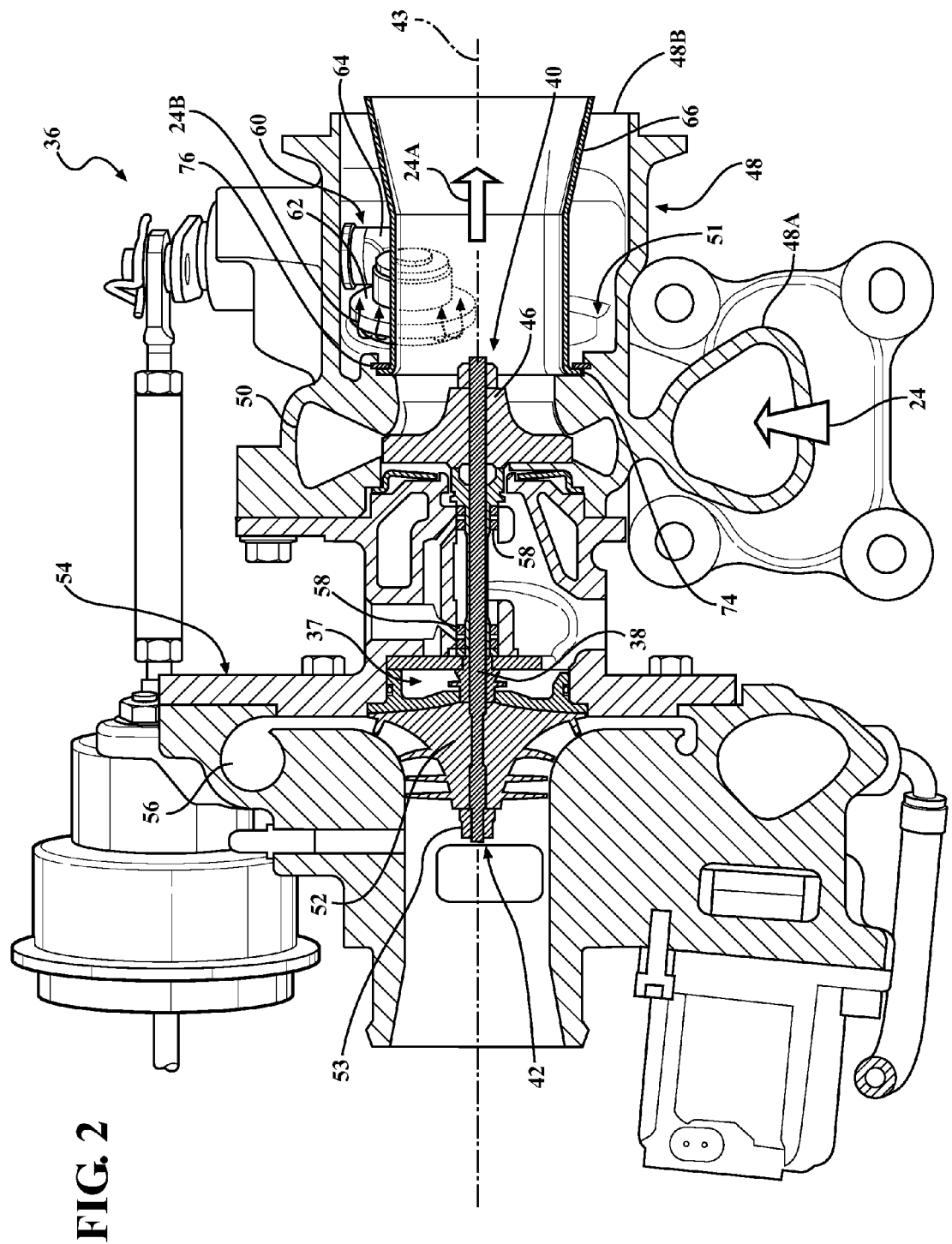
FIG. 2 is a schematic partial cross-sectional view of the turbocharger assembly shown in FIG. 1, showing a turbine housing with a waste-gate assembly and a diffuser.

As shown in FIG. 2, the turbocharger assembly 36 includes a rotating assembly 37. The rotating assembly 37 includes a shaft 38 having a first end 40 and a second end 42. The rotating assembly 37 also includes a turbine wheel 46 mounted on the shaft 38 proximate to the first end 40 and configured to be rotated along with the shaft 38 about an axis 43 by post-combustion gases 24 emitted from the cylinders 14. The turbine wheel 46 is typically formed from a temperature and oxidation resistant material, such as a nickel-chromium-based "inconel" super-alloy to reliably withstand temperatures of the post-combustion gases 24, which in some engines may approach 2,000 degrees Fahrenheit. The turbine wheel 46 is disposed inside a turbine housing 48 that defines a turbine housing inlet 48A, and a turbine housing outlet 48B, a turbine volute or scroll 50, a turbine outlet cavity 51. The turbine housing inlet 48A is configured to channel the post-combustion gases 24 to the turbine scroll 50 via the turbine scroll 50. The turbine scroll 50 is configured to achieve specific performance characteristics, such as efficiency and response, of the turbocharger assembly 36. In a typical turbocharger unlike the turbocharger assembly 36, aft of the turbine wheel 46 the post-combustion gases 24 are discharged into the turbine outlet cavity 51. From the turbine outlet cavity 51 of a typical turbocharger, the post-combustion gases are then exhausted from the turbine housing 48 out through the turbine housing outlet 48B to an exhaust system (not shown). As understood by those skilled in the art, a representative exhaust system may include one or more emission control devices, such as a catalytic converter 82 (shown in FIG. 1). The representative catalytic converter 82 may be close-coupled to the turbine housing outlet 48B.

As further shown in FIG. 2, the rotating assembly 37 also includes a compressor wheel 52 mounted on the shaft 38 between the first and second ends 40, 42. The compressor wheel 52 is retained on the shaft 38 via a specially configured fastener, such as a nut 53. Direction of the thread on the nut 53 may be selected such that the jam nut will have a tendency to tighten rather than loosen as the shaft 38 is spun up by the post-combustion gases 24.

The compressor wheel 52 is configured to pressurize the airflow 32 being received from the ambient for eventual delivery to the cylinders 14. The compressor wheel 52 is disposed inside a compressor cover 54 that includes a compressor volute or scroll 56. The compressor wheel 52 receives the airflow 32 and directs the airflow to the compressor scroll 56. The compressor scroll 56 is configured to achieve specific performance characteristics, such as peak airflow and efficiency of the turbocharger assembly 36. Accordingly, rotation is imparted to the shaft 38 by the post-combustion exhaust gases 24 energizing the turbine wheel 46, and is in turn communicated to the compressor wheel 52 owing to the compressor wheel being fixed on the shaft. Furthermore, the rotating assembly 37 is supported for rotation about the axis 43 via journal bearings 58. During operation of the turbocharger assembly 36, the rotating assembly 37 may frequently operate at speeds over 100,000 revolutions per minute (RPM) while generating boost pressure for the engine 10. As understood by those skilled in the art, the variable flow and force of the post-combustion exhaust gases 24 influences the amount of boost pressure that may be generated by the compressor wheel 52 throughout the operating range of the engine 10.

Figure 3:
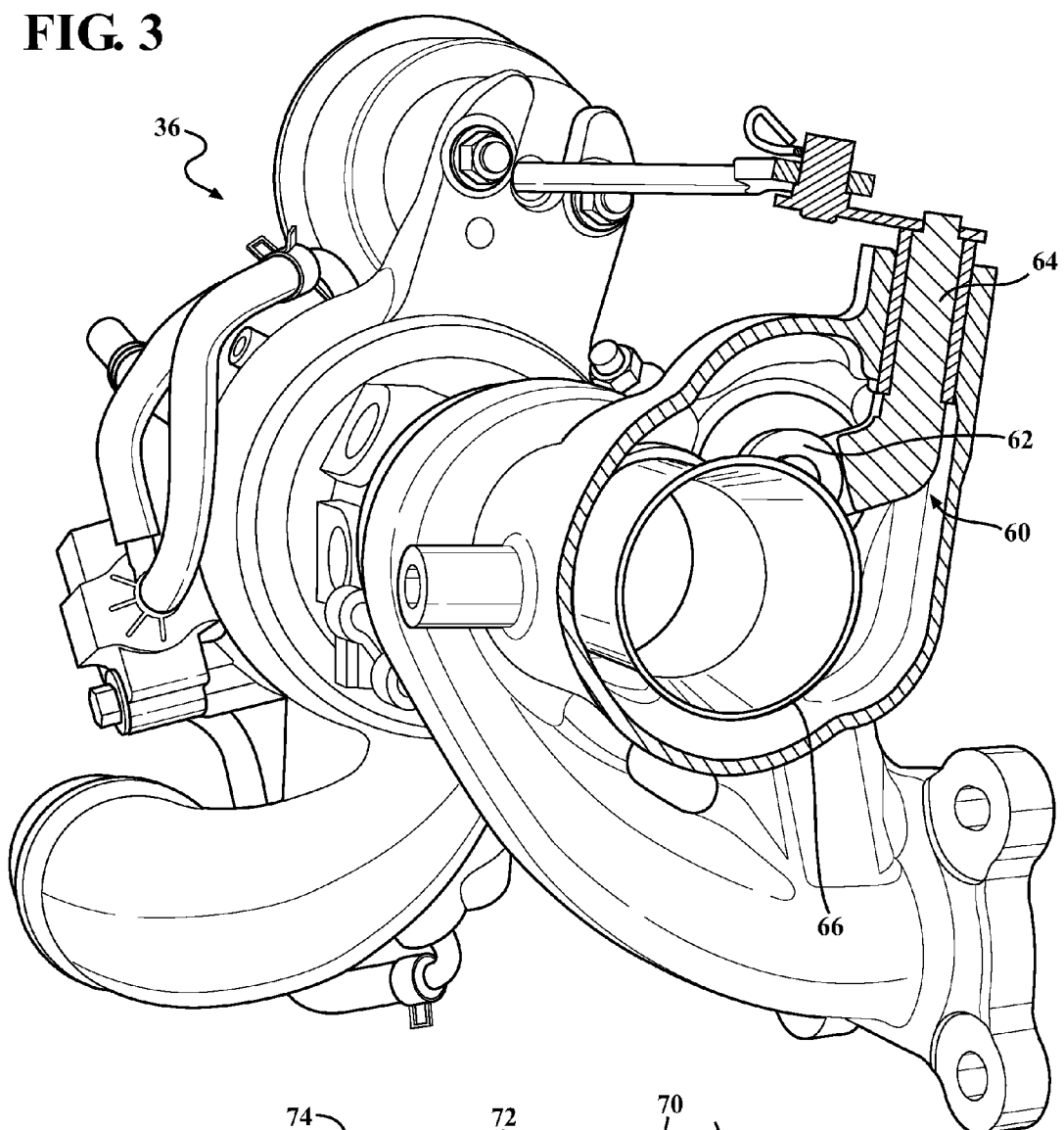
FIG. 3 is a perspective partial cross-sectional view of the turbocharger assembly shown in FIGS. 1 and 2.

As shown in both FIGS. 2 and 3, the turbocharger assembly 36 may include a waste-gate assembly 60. The waste-gate assembly 60 is configured to selectively redirect at least a portion of the post-combustion exhaust gases 24, such as a portion 24B, into the turbine outlet cavity 51 in bypass of the turbine wheel 46. The waste-gate assembly 60 includes a valve 62 fixed to a rotatable shaft 64. The shaft 64 is selectively actuated to open and close the valve 62 to thereby control operation of the turbocharger assembly 36 by limiting on demand rotational speed of the rotating assembly 37 and pressure of the airflow 32 received from the ambient. However, the portion 24B of post-combustion gases redirected by the waste-gate valve 62 typically exits from under the waste-gate valve at once in multiple directions (as shown in FIG. 2), and thus may impinge and disrupt a portion 24A of the post-combustion gases 24 exiting the turbine wheel 46.

As additionally shown in FIGS. 2 and 3, the turbocharger assembly 36 also includes a diffuser 66 arranged inside the turbine outlet cavity 51. The diffuser 66 converts kinetic energy of the post-combustion gases 24 exiting the turbine wheel 46 into pressure by gradually slowing or diffusing velocity of the post-combustion gases. The diffuser 66 channels the post-combustion gases 24 aft of the turbine wheel 46 and out to the turbine housing outlet 48B, without discharging into the turbine outlet cavity 51. Additionally, the diffuser 66 separately channels the portion 24A of post-combustion gases 24 aft of the turbine wheel 46 and the portion 24B of post-combustion gases redirected by the waste-gate valve 62, i.e., maintains separation between the two streams of the post-combustion gases. As a result, the diffuser 66 limits disruption of flow of the portion 24A of the post-combustion gases 24 aft of the turbine wheel 46 by the portion 24B of post-combustion gases redirected by the waste-gate valve 62. Furthermore, by separating the flow of the portion 24A of the post-combustion gases 24 aft of the turbine wheel 46 from the portion 24B of post-combustion gases redirected by the waste-gate valve 62, the diffuser 66 streamlines the overall flow of the post-combustion gases 24 into the exhaust system and the emissions control device, such as the catalytic converter 82. Thus streamlined, the flow of the post-combustion gases 24 would in turn provide fuller and more predictable coverage of an inlet to the catalytic converter 82, which would generate a quicker light-off and further enhanced operating efficiency of such an emissions control device. Furthermore, the diffuser 66 can be used to improve energy extraction from the post-combustion gases 24 in any turbocharger design, with or without the waste-gate valve 62. Accordingly, the diffuser 66 can also be used on a turbocharger assembly that does not employ a waste-gate valve 62, such as a variable geometry turbocharger or VGT (not shown).

The post-combustion gases 24 aft of the turbine wheel 46 have a tendency to swirl and migrate centrifugally away from the axis 43 to the outer diameter of the turbine housing 48 even with the waste-gate valve 62 closed. In such a case the flow of the post-combustion gases 24 aft of the turbine wheel 46 would be disrupted even by a closed waste-gate valve 62. Therefore, even with the waste-gate valve 62 closed or in a turbocharger without a waste-gate valve, the diffuser 66 would serve to streamline the flow of the post-combustion gases 24 aft of the turbine wheel 46 and would improve flow efficiency of the turbine wheel as a result. The separately mounted diffuser 66 permits an efficient diffuser shape having a shallow angle θ (shown in FIG. 4) that extends beyond the turbine housing outlet 48B. The diffuser 66 that extends beyond the turbine housing outlet 48B is intended to maintain streamlined and focused flow of the post-combustion gases 24 to the catalytic converter 82, as compared with a shorter diffuser element that may otherwise be formed integrally with the turbine housing 48.

The diffuser 66 is defined by a substantially cylindrical shape 68 and is arranged such that the axis of the cylindrical shape coincides with the axis 43. The cylindrical shape 68 includes a diverging inner surface 70 configured to channel and diffuse the post-combustion gases 24 aft of the turbine wheel 46. The diffuser 66 is additionally defined by an outer surface 72 that is configured to receive and channel the portion 24B of post-combustion gases 24 redirected by the waste-gate valve 62 to the turbine housing outlet 48B to more efficiently target the catalytic converter 82 for improved catalyst light-off. Furthermore, the turbine housing 48 and the diffuser 66 may be separate components such that the diffuser is fixed to the turbine housing. The diffuser 66 that is configured as a separate component from the turbine housing 48 may be constructed as a steel pipe that is formed at least in part by being drawn from a steel sheet thus being straightforward and economical to manufacture. A stainless steel sheet can be used to reliably withstand elevated temperatures of the post-combustion gases 24. The separate diffuser 66 manufactured from a thin-walled stainless steel sheet would permit a lighter and less costly turbocharger assembly overall than if the diffuser was cast integrally with the turbine housing 48.

Figure 4:
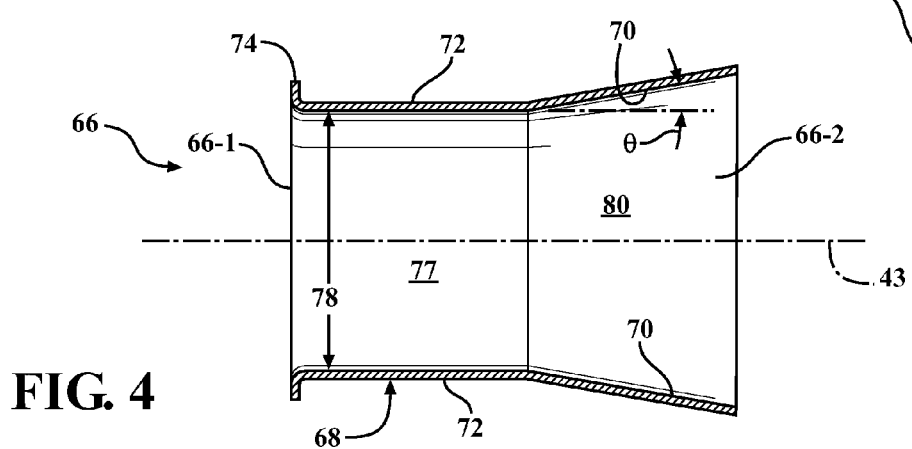
FIG. 4 is a schematic cross-sectional view of the diffuser shown in FIGS. 2 and 3.

As shown in FIG. 4, the diffuser 66 may include a first end 66-1 and a second end 66-2. The first end 66-1 includes a flange 74. As shown, the flange 74 is arranged substantially perpendicular to the axis 43. A snap ring 76, shown in FIG. 2, may then be used to retain the diffuser 66 inside the turbine housing 48 at the flange 74. In such a case, the snap ring 76 abuts the flange 74 and presses the flange against the turbine housing 48 to thereby fix the diffuser 66 relative to the turbine housing. Other appropriate fastening devices, such as one or more screws or a swaged portion (not shown) of the turbine housing 48, may also be used to fix the diffuser 66 to the turbine housing. As shown in FIG. 4, the diffuser 66 may include a first portion 77 extending from the first end 66-1 and having a generally uniform diameter 78, and a flared second portion 80 extending from the first portion to the second end 66-2. The first portion 77 of the diffuser 66 facilitates collection and streamlining of the post-combustion gases 24 aft of the turbine wheel 46, while the flared second portion 80 diffuses the post-combustion gases 24 for more complete coverage of the entrance into the catalytic converter 82, as discussed above.

The post-combustion gases 24 aft of the turbine wheel 46 have a tendency to swirl and migrate centrifugally away from the axis 43 to the outer diameter of the turbine housing 48 even with the waste-gate valve 62 closed. In such a case the flow of the post-combustion gases 24 aft of the turbine wheel 46 would be disrupted even by a closed waste-gate valve 62. Therefore, even with the waste-gate valve 62 closed or in a turbocharger without a waste-gate valve, the diffuser 66 would serve to streamline the flow of the post-combustion gases 24 aft of the turbine wheel 46 and would improve flow efficiency of the turbine wheel as a result. The separately mounted diffuser 66 permits an efficient diffuser shape having a shallow angle θ (shown in FIG. 4) that extends beyond the turbine housing outlet 48B, as shown in FIG. 2. The diffuser 66 that extends beyond the turbine housing outlet 48B is intended to maintain streamlined and focused flow of the post-combustion gases 24 out beyond the turbine housing outlet and to the catalytic converter 82, as compared with a shorter diffuser element that may otherwise be formed integrally with the turbine housing.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A turbocharger assembly for pressurizing an airflow for delivery to an internal combustion engine that generates post-combustion gases, the turbocharger assembly comprising:
   a compressor cover;
   a turbine housing defining a turbine outlet cavity, a turbine housing inlet, and a turbine housing outlet;
   a rotating assembly having a turbine wheel disposed inside the turbine housing and a compressor wheel disposed inside the compressor cover, wherein the rotating assembly is rotated about an axis by the post-combustion gases, and wherein the turbine housing inlet is configured to channel the post-combustion gases to the turbine wheel and the turbine housing outlet is configured to exhaust the post-combustion gases aft of the turbine wheel;

a waste-gate valve arranged in the turbine housing and configured to selectively redirect at least a portion of the post-combustion gases into the turbine outlet cavity in bypass of the turbine wheel; and a diffuser arranged inside the turbine outlet cavity, having an outer surface including a cylindrical upstream portion and a flared downstream portion, and configured to separately channel the post-combustion gases aft of the turbine wheel and the portion of post-combustion gases redirected by the waste-gate valve and out to the turbine housing outlet, without discharging into the turbine outlet cavity, to thereby limit disruption of flow of the post-combustion gases aft of the turbine wheel by the portion of post-combustion gases redirected by the waste-gate valve;

wherein:
the diffuser extends beyond the turbine housing outlet; and
a plane perpendicular to the axis intersects each of the turbine housing outlet and the flared downstream portion.

2. The turbocharger assembly of claim 1, wherein the diffuser includes an outer surface configured to receive and channel the portion of post-combustion gases redirected by the waste-gate valve to the turbine housing outlet.

3. The turbocharger assembly of claim 1, further comprising a catalytic converter close-coupled to the turbine housing outlet, and wherein the diffuser extends beyond the turbine housing outlet to maintain streamlined and focused flow of the post-combustion gases beyond the turbine housing outlet and out to the catalytic converter.

4. The turbocharger assembly of claim 1, wherein the turbine housing and the diffuser are separate components, and wherein the diffuser is fixed to the turbine housing.

5. The turbocharger assembly of claim 4, wherein the diffuser is a steel pipe.

6. The turbocharger assembly of claim 4, wherein the diffuser is fastened to the turbine housing via a snap ring.

7. The turbocharger assembly of claim 6, wherein the diffuser includes a first end and a second end, and wherein the first end includes a flange and the snap ring abuts the flange to thereby fix the diffuser to the turbine housing.

8. An internal combustion engine comprising:
a cylinder configured to receive an air-fuel mixture for combustion therein;
a reciprocating piston disposed inside the cylinder and configured to exhaust post-combustion gases therefrom; and
a turbocharger assembly in fluid communication with the piston and configured to pressurize an airflow being received from the ambient and deliver the pressurized airflow to the cylinder, the turbocharger assembly including:
a compressor cover, and a turbine housing defining a turbine outlet cavity, a turbine housing inlet, and a turbine housing outlet;
a rotating assembly having a turbine wheel disposed inside the turbine housing and a compressor wheel disposed inside the compressor cover, wherein the rotating assembly is rotated about an axis by the post-combustion gases, and wherein the turbine housing inlet is configured to channel the post-combustion gases to the turbine wheel and the turbine housing outlet is configured to exhaust the post-combustion gases aft of the turbine wheel;
a waste-gate valve arranged in the turbine housing and configured to selectively redirect at least a portion of the post-combustion gases into the turbine outlet cavity in bypass of the turbine wheel; and
a diffuser arranged inside the turbine outlet cavity, having an outer surface including a cylindrical upstream portion and a flared downstream portion, and configured to separately channel the post-combustion gases aft of the turbine wheel and the portion of post-combustion gases redirected by the waste-gate valve and out to the turbine housing outlet, without discharging into the turbine outlet cavity, to thereby limit disruption of flow of the post-combustion gases aft of the turbine wheel by the portion of post-combustion gases redirected by the waste-gate valve;
wherein:
the diffuser extends beyond the turbine housing outlet; and
a plane perpendicular to the axis intersects each of the turbine housing outlet and the flared downstream portion.

9. The engine of claim 1, wherein the diffuser includes an outer surface configured to receive and channel the portion of post-combustion gases redirected by the waste-gate valve to the turbine housing outlet.

10. The engine of claim 1, further comprising a catalytic converter close-coupled to the turbine housing outlet, and wherein the diffuser extends beyond the turbine housing outlet to maintain streamlined and focused flow of the post-combustion gases beyond the turbine housing outlet and out to the catalytic converter.

11. The engine of claim 1, wherein the turbine housing and the diffuser are separate components, and wherein the diffuser is fixed to the turbine housing.

12. The engine of claim 11, wherein the diffuser is a steel pipe.

13. The engine of claim 11, wherein the diffuser is fastened to the turbine housing via a snap ring.

14. The engine of claim 13, wherein the diffuser includes a first end and a second end, and wherein the first end includes a flange and the snap ring abuts the flange to thereby fix the diffuser to the turbine housing.

* * * * *